United States Patent
Wang et al.

(10) Patent No.: US 11,181,421 B2
(45) Date of Patent: Nov. 23, 2021

(54) SPECTROMETER

(71) Applicant: Crystalvue Medical Corporation, Taoyuan (TW)

(72) Inventors: William Wang, Taoyuan (TW); Che-Liang Tsai, Taoyuan (TW); Chung-Cheng Chou, Taiwan (CN)

(73) Assignee: Crystalvue Medical Corporation, Taoyuan (TW)

( * ) Notice: Subject to any disclaimer, the term of this patent is extended or adjusted under 35 U.S.C. 154(b) by 0 days.

(21) Appl. No.: 16/891,931

(22) Filed: Jun. 3, 2020

(65) Prior Publication Data

US 2021/0003446 A1    Jan. 7, 2021

Related U.S. Application Data

(60) Provisional application No. 62/870,962, filed on Jul. 5, 2019.

(51) Int. Cl.
*G01J 3/18* (2006.01)
*G01J 3/02* (2006.01)

(52) U.S. Cl.
CPC ........... *G01J 3/0202* (2013.01); *G01J 3/0208* (2013.01); *G01J 3/0218* (2013.01); *G01J 3/18* (2013.01)

(58) Field of Classification Search
CPC ........ G01J 3/0202; G01J 3/0208; G01J 3/218; G01J 3/18
See application file for complete search history.

(56) References Cited

U.S. PATENT DOCUMENTS

| | | | | |
|---|---|---|---|---|
| 6,636,664 B2* | 10/2003 | Snyder | ................ | G02B 6/3524 385/115 |
| 2002/0176124 A1* | 11/2002 | Wise | ..................... | G01J 3/1838 359/1 |
| 2004/0136718 A1* | 7/2004 | McGuire | ............ | G02B 6/29383 398/88 |
| 2006/0092995 A1* | 5/2006 | Frankel | ................. | H01S 5/4062 372/18 |
| 2008/0030728 A1* | 2/2008 | Nguyen | ................ | G01J 3/0262 356/328 |
| 2011/0285995 A1* | 11/2011 | Tkaczyk | ................ | G01J 3/021 356/326 |

OTHER PUBLICATIONS

Foainc, https://www.youtube.com/watch?v=LVRUwlt0_BM, Dec. 1, 2013 (Year: 2013).*

* cited by examiner

*Primary Examiner* — Maurice C Smith
(74) *Attorney, Agent, or Firm* — Patterson + Sheridan, LLP

(57) ABSTRACT

A spectrometer is disclosed. The spectrometer includes a fiber input, a collimator lens, a rotating shaft, a grating, a focal lens and a focal plane which have arranged in order. A broadband incident light of the fiber input becomes a first parallel beam through the collimator lens and separated by the grating into multiple parallel beams of different wavelengths and then focused by the focal lens to emit an output beams to an imaging position on the focal plane. The spectrometer can rotate the collimator lens and fiber input to change the imaging position on the focal plane.

10 Claims, 4 Drawing Sheets

SPECTROMETER

CROSS REFERENCE TO RELATED APPLICATIONS

This application claims the benefit of U.S. Provisional Application 62/870,962 filed on Jul. 5, 2019.

BACKGROUND OF THE INVENTION

Field of the Invention

The invention relates to a spectrometer; in particular, to a spectrometer capable of adjusting/calibrating imaging position.

Description of the Prior Art

Recently, due to the vigorous development of various fields such as electronics, biochemistry, medicine, optoelectronics, etc., the need of using the spectrometer to analyze various photophysical and photochemical phenomenon of materials is increasing. The spectrometer is a kind of physical and chemical analysis instrument, which can be divided into different kinds of spectrometer according to the applicable wavelengths, such as an ultraviolet light-visible light spectrometer, a near infrared spectrometer and an infrared spectrometer.

The main function of the spectrometer is a scientific instrument that decomposes the light with a complex composition into spectral lines. It is composed of a prism or a diffraction grating, etc. After the multi-color light is split by the spectroscopic element (for example, a prism or a diffraction grating), a pattern is formed by arranging the split beams in order of the light wavelength (or frequency). The largest part of the spectrum is the visible part of the electromagnetic spectrum. Electromagnetic radiation in this wavelength range is called visible light. The spectrometer can be used to measure the light reflected from the surface of the object, the penetrating light passing through the object and the light absorbed by the object.

However, the conventional spectrometer still encounters many problems in practical application; for example, it is not easy for the user to adjust/calibrate the imaging position of the beams focused on the focal plane, which needs to be overcome.

SUMMARY OF THE INVENTION

Therefore, the invention provides a spectrometer to solve the above-mentioned problems of the prior arts.

A preferred embodiment of the invention is a spectrometer. In this embodiment, the spectrometer includes a fiber input, a collimator lens, a rotating shaft, a grating, a focal lens and a focal plane which have arranged in order. A broadband incident light of the fiber input becomes a first parallel beam through the collimator lens and separated by the grating into multiple parallel beams of different wavelengths and then focused by the focal lens to emit an output beams to an imaging position on the focal plane. The spectrometer can rotate the collimator lens and fiber input to change the imaging position on the focal plane.

In an embodiment, when the collimator lens and the fiber input rotate, a moving direction of the fiber input and a moving direction of the imaging position on the focal plane are opposite to each other.

In an embodiment, when the fiber input moves downward, the imaging position on the focal plane moves upward.

In an embodiment, when the fiber input moves upward, the imaging position on the focal plane moves downward.

In an embodiment, a rotation direction of the collimator lens and the fiber input is clockwise or counterclockwise.

Another preferred embodiment of the invention is also a spectrometer. In this embodiment, the spectrometer includes a fiber input, a relay lens, a collimator lens, a grating, a focal lens and a focal plane which have arranged in order. A broadband incident light of the fiber input is extended by the relay lens and then becomes a first parallel beam through the collimator lens and separated by the grating into multiple parallel beams of different wavelengths and then focused by the focal lens to emit an output beams to an imaging position on the focal plane. The spectrometer can move the relay lens and fiber input to change the imaging position on the focal plane.

In an embodiment, when the relay lens and the fiber input move, a moving direction of the relay lens and the fiber input and a moving direction of the imaging position on the focal plane are opposite to each other.

In an embodiment, when the relay lens and the fiber input move upward, the imaging position on the focal plane moves downward.

In an embodiment, when the relay lens and the fiber input move downward, the imaging position on the focal plane moves upward.

In an embodiment, when the relay lens and the fiber input move, a moving direction of the relay lens and the fiber input is the same with a moving direction of an incident position on the collimator lens where the incident light is emitted to.

In an embodiment, when the relay lens and the fiber input move upward, the incident position on the collimator lens where the incident light is emitted to also moves upward.

In an embodiment, when the relay lens and the fiber input move downward, the incident position on the collimator lens where the incident light is emitted to also moves downward.

Compared to the prior art, the spectrometer of the invention can simply rotate or move its input-side element to move up or down the imaging position on the focal plane that the beams are focused, thereby achieving the effect of facilitating the user to adjust/calibrate the imaging position of the spectrometer.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

Figure 1:
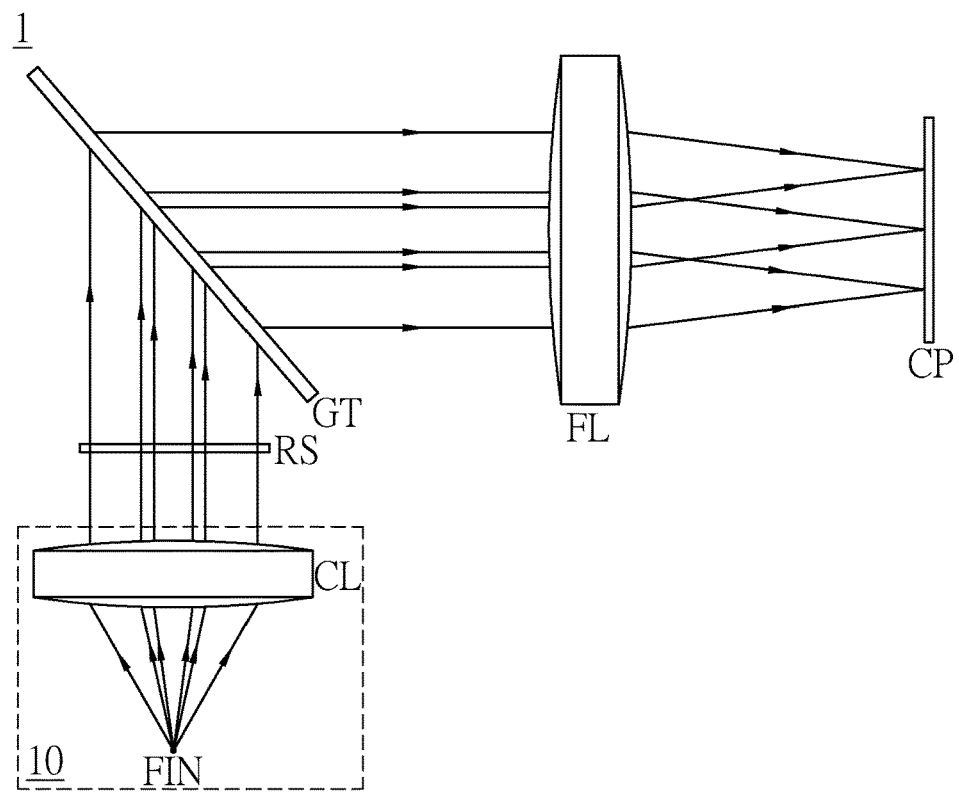
FIG. 1 is a top view of a spectrometer in an embodiment of the invention.

Exemplary embodiments of the invention are referenced in detail now, and examples of the exemplary embodiments are illustrated in the drawings. Further, the same or similar reference numerals of the components/components in the drawings and the detailed description of the invention are used on behalf of the same or similar parts.

An embodiment of the invention is a spectrometer. In practical applications, the main function of the spectrometer is to decompose a light with complex components into spectral lines, which can be arranged in order of the wavelength (or frequency) of the beams to form patterns. There are different kinds of spectrometer according to the applicable wavelength, such as an ultraviolet light-visible light spectrometer, a near infrared spectrometer, an infrared spectrometer, etc., but not limited to this.

Figure 2:
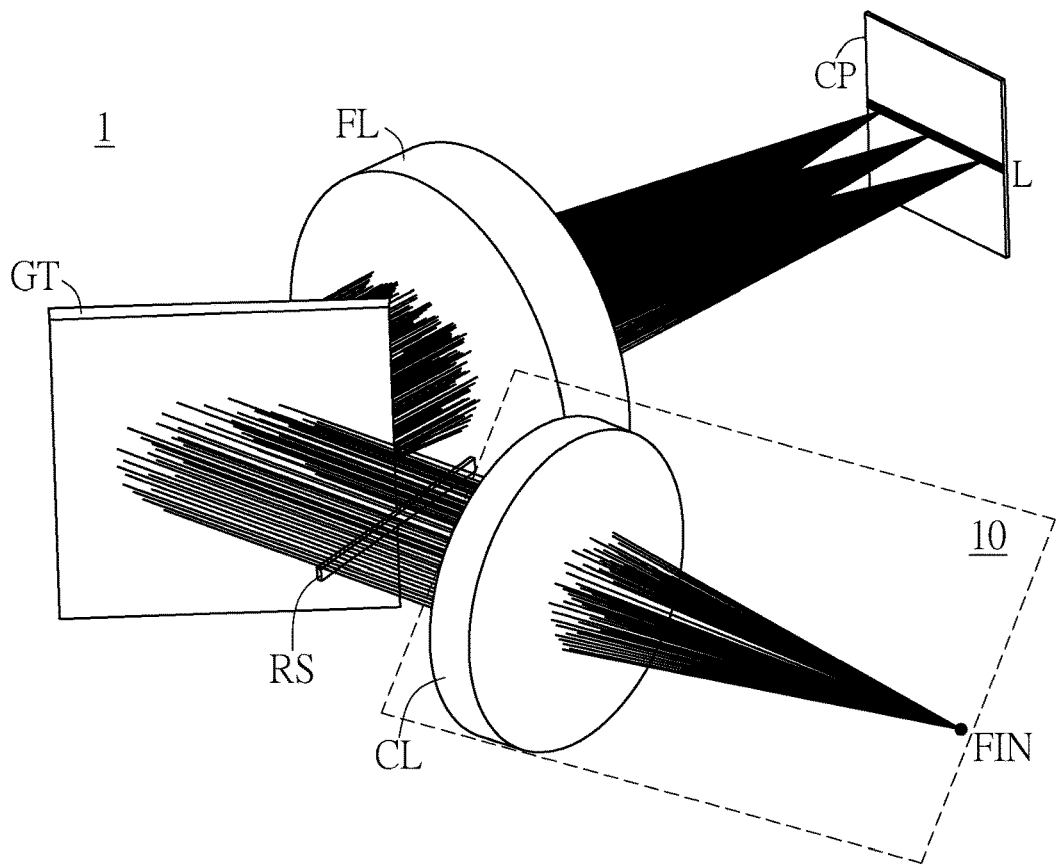
FIG. 2 is a side view of the spectrometer in FIG. 1.

Please refer to FIG. 1 and FIG. 2. FIG. 1 and FIG. 2 are a top view and a side view of a spectrometer in an embodiment of the invention respectively.

As shown in FIG. 1 and FIG. 2, the spectrometer 1 can include a fiber input FIN, a collimator lens CL, a rotating shaft RS, a grating GT, a focal lens FL and a focal plane CP arranged in order. In this embodiment, the fiber input FIN and the collimator lens CL are designed to rotate together, so it can be defined as a rotation combination 10, but not limited to this.

In fact, the collimating lens CL is used to convert a broadband incident light it receives into parallel collimated beams; the grating GT is used as a light-splitting element, the amplitude or phase (or both) of the parallel collimated beams will be periodically spatially modulated through a regular structure of the grating GT; the focal lens FL is used to focus the parallel collimated beams it receives on the focal plane CP.

In this embodiment, the fiber input FIN provides the broadband incident light to the collimator lens CL and the collimator lens CL converts it into first parallel beams to the grating GT. Next, the grating GT separates the first parallel beams and emits multiple parallel beams of different wavelengths to the focal lens FL, and then the focal lens FL focuses them on an original imaging position L of the focal plane CP.

It should be noted that the spectrometer 1 in this embodiment can achieve the effect of changing the original imaging position L by rotating the rotation combination 10 formed by the collimator lens CL and the fiber input FIN. In this embodiment, when the rotation combination 10 formed by the collimator lens CL and the fiber input FIN rotates, the position of the fiber input FIN will be changed, and a moving direction of the fiber input FIN and a moving direction of the original imaging position L on the focal plane CP are opposite to each other.

Figure 3:
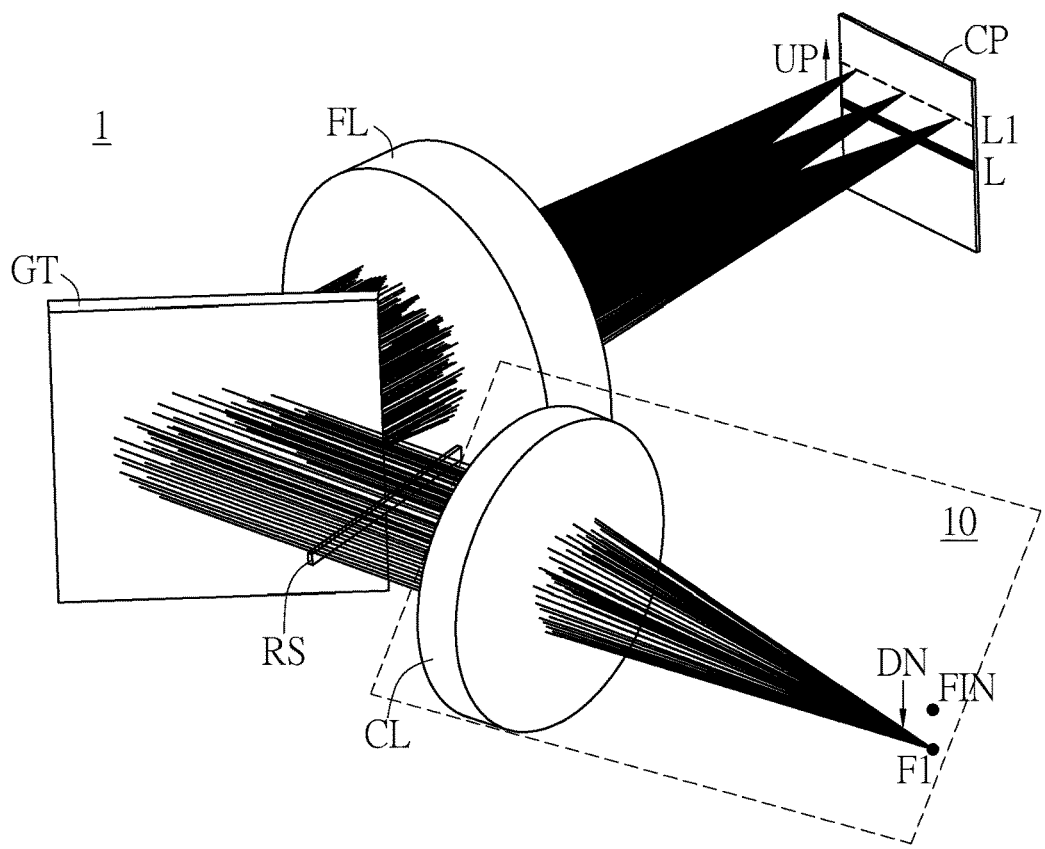
FIG. 3 is a schematic diagram showing that when the collimator lens and the fiber input rotate, the fiber input moves downward and the imaging position on the focal plane moves upward.

For example, as shown in FIG. 3, when the rotation combination 10 formed by the collimator lens CL and the fiber input FIN rotates in a first rotation direction, if the fiber input FIN moves downward DN to the first input position F1, the imaging position on the focal plane CP will move upward UP from the original imaging position L to a first imaging position L1.

Figure 4:
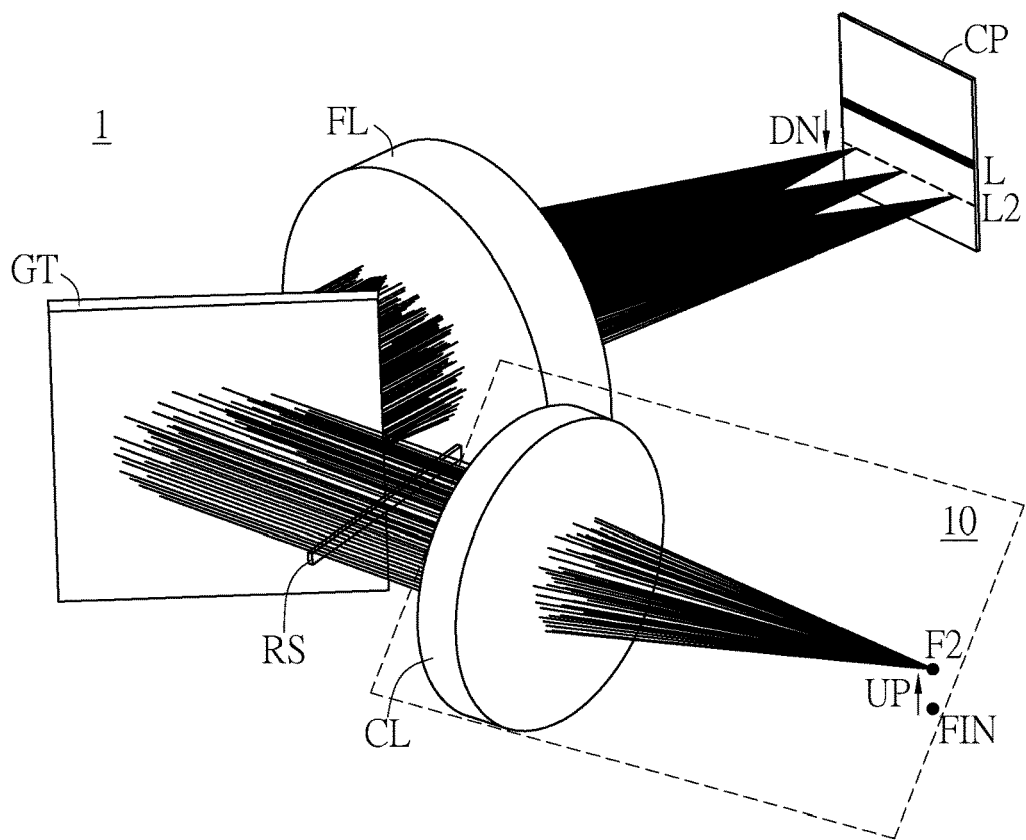
FIG. 4 is a schematic diagram showing that when the collimator lens and the fiber input rotate, the fiber input moves upward and the imaging position on the focal plane moves downward.

In another embodiment, as shown in FIG. 4, when the rotation combination 10 formed by the collimator lens CL and the fiber input FIN rotates in a second rotation direction, if the fiber input FIN moves upward UP to a second input position F2, the imaging position on the focal plane CP will move downward DN from the original imaging position L to a second imaging position L2.

It should be noted that the first rotation direction and the second rotation direction of the rotation combination 10 formed by the collimator lens CL and the fiber input FIN can be clockwise and counterclockwise respectively, and there is no specific limitation. In other words, the spectrometer 1 in this embodiment can move up and down the original imaging position L on the focal plane CP by rotating its rotation combination 10 in different rotation directions, thereby achieving the effect of adjusting/correcting the imaging position.

Figure 5:
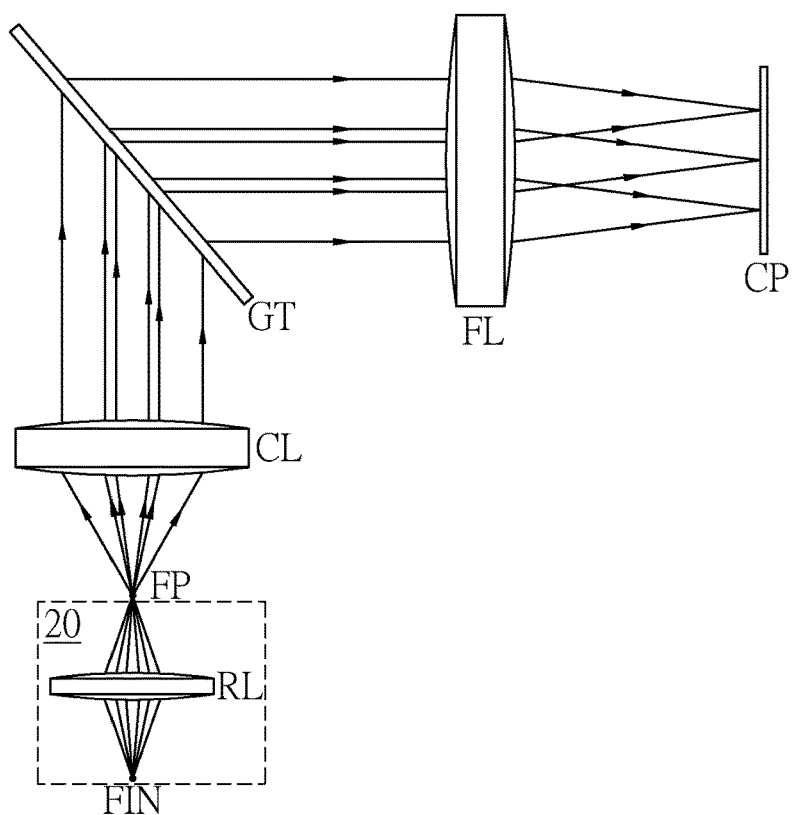
FIG. 5 is a top view of a spectrometer in another embodiment of the invention.
Figure 6:
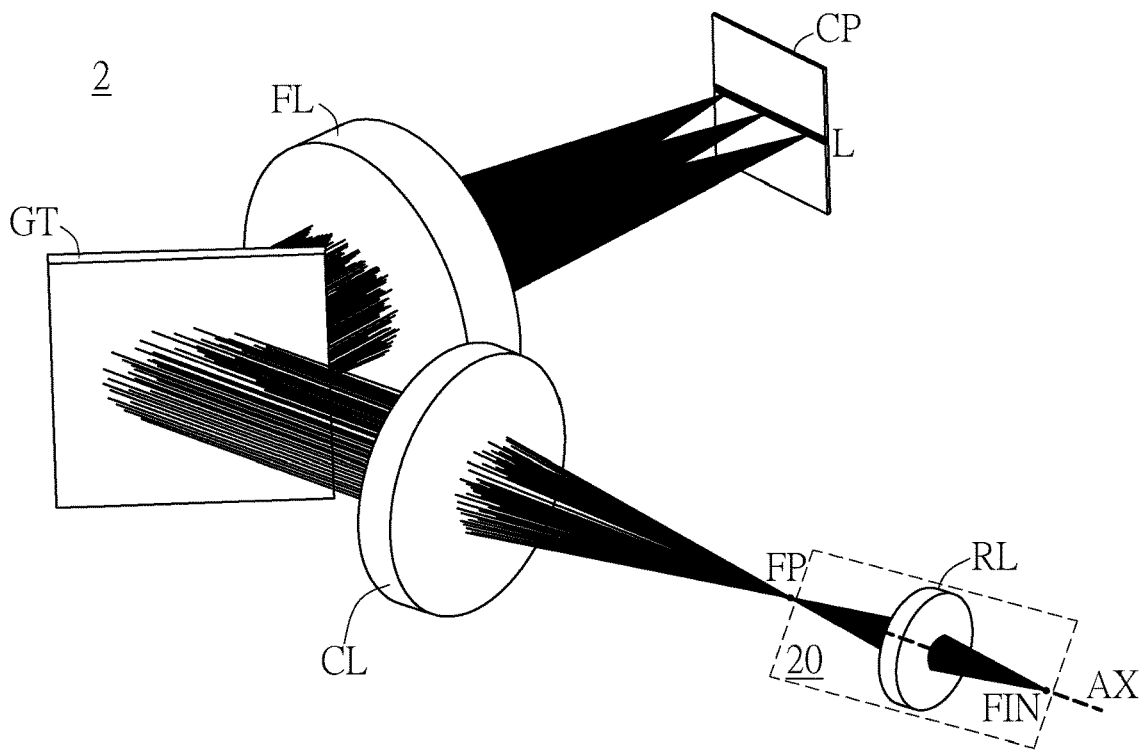
FIG. 6 is a side view of the spectrometer in FIG. 5.

Another embodiment of the invention is also a spectrometer. Please refer to FIG. 5 and FIG. 6. FIG. 5 and FIG. 6 are a top view and a side view of the spectrometer in this embodiment respectively.

As shown in FIG. 5 and FIG. 6, the spectrometer 2 can include a fiber input FIN, a relay lens RL, a collimating lens CL, a grating GT, a focal lens FL and a focal plane CP arranged in order. Wherein, the fiber input FIN and the relay lens RL in this embodiment are designed to move together, so it can be defined as a displacement combination 20, but not limited to this.

In fact, the relay lens RL is usually composed of two sets of lenses installed in the lens barrel, but not limited to this. The lens forming the relay lens RL can be an ordinary spherical lens or an aspheric lens, depending on actual requirements. The main function of the relay lens RL is to effectively extend the focal length of the imaging system and reduce interference on the mechanism.

In this embodiment, the broadband incident light provided by the fiber input FIN are extended by the relay lens RL and emitted to the collimator lens CL, and then the collimator lens CL outputs first parallel beams, and the grating GT splits the first parallel beams to emit multiple parallel beams with different wavelengths to the focal lens FL, and then the focal lens FL focuses the parallel beams at the original imaging position L on the focal plane CP.

It should be noted that the spectrometer 2 in this embodiment can achieve the effect of changing the original imaging position L by moving the displacement combination 20 formed by the relay lens RL and the fiber input FIN.

In this embodiment, when the displacement combination 20 formed by the relay lens RL and the fiber input FIN has not moved, the relay lens RL and the fiber input FIN are aligned with the central axis AX. When the displacement combination 20 formed by the relay lens RL and the fiber input FIN starts to move, the relay lens RL and the fiber input FIN will start to deviate from the central axis AX, and the moving direction of the relay lens RL and the fiber input FIN and the moving direction of the original imaging position L on the focal plane CP are opposite.

Figure 7:
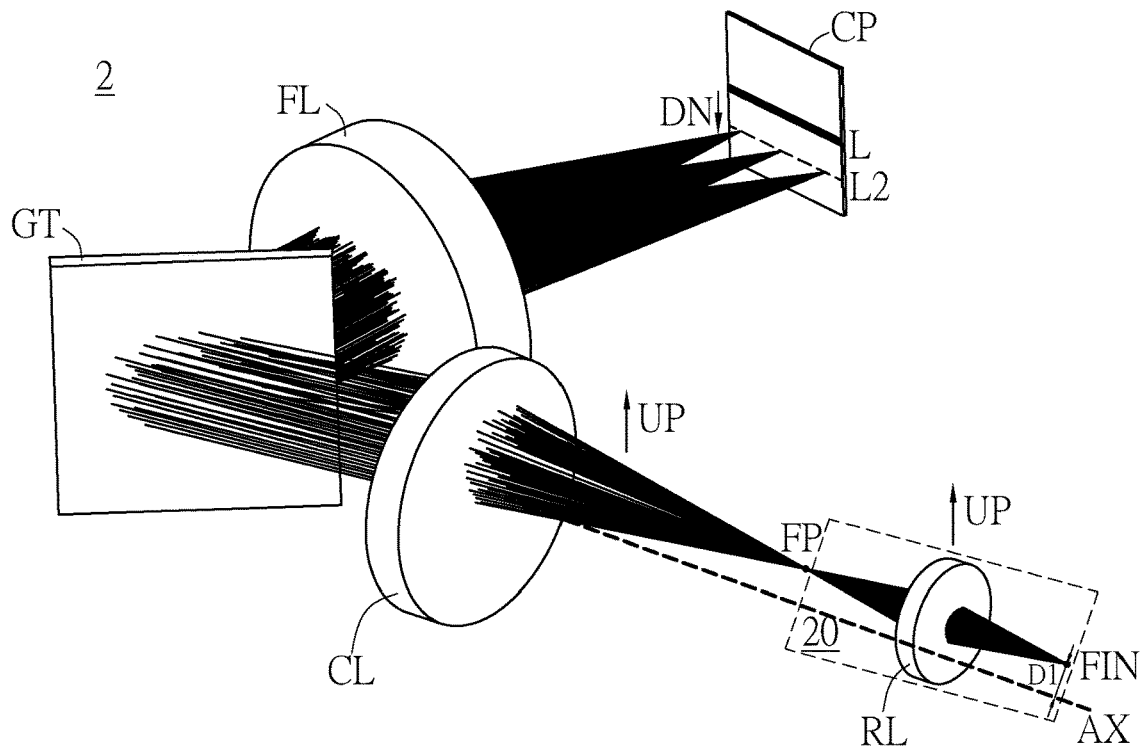
FIG. 7 is a schematic diagram showing that when the relay lens and the fiber input move upward, the imaging position on the focal plane moves downward.

For example, as shown in FIG. 7, when the displacement combination 20 formed by the relay lens RL and the fiber input FIN moves upward UP (that is, deviating from the central axis AX upward UP) by a first distance D1, the imaging position on the focal plane CP will be shifted from the original imaging position L downward DN to the second imaging position L2.

Figure 8:
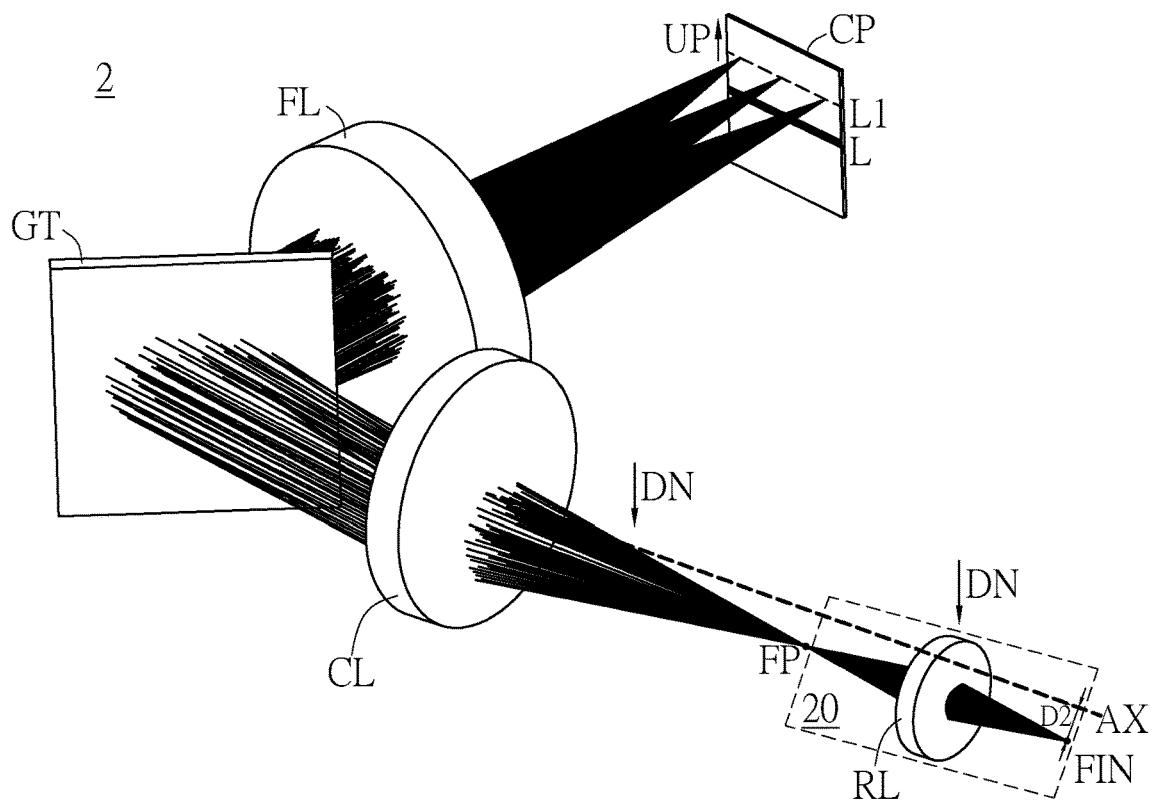
FIG. 8 is a schematic diagram showing that when the relay lens and the fiber input move downward, the imaging position on the focal plane moves upward.

As shown in FIG. 8, when the displacement combination 20 formed by the relay lens RL and the fiber input FIN moves downward DN (that is, deviating from the central axis AX downward DN) by a second distance D2, the imaging position on the focal plane CP will be shifted from the original imaging position L upward UP to the first imaging position L1.

In other words, the spectrometer 2 in this embodiment can move up and down the original imaging position L on the focal plane CP by moving its displacement combination 20 in different directions to achieve the effect of adjusting/correcting the imaging position.

In addition, in this embodiment, when the displacement combination 20 formed by the relay lens RL and the fiber input FIN starts to move, the incident position on the collimator lens CL that the broadband incident light provided by the displacement combination 20 is emitted to will be also changed, and the moving direction of the relay lens RL and the fiber input FIN is the same with the moving direction of the incident position on the collimator lens CL that the broadband incident light is emitted to.

For example, as shown in FIG. 7, when the displacement combination 20 formed by the relay lens RL and the fiber input FIN moves upward UP (that is, deviating from the central axis AX upward UP) by the first distance D1, the incident position on the collimator lens CL that the incident light is emitted to will also move upward UP (that is, deviating from the central axis AX upward UP).

As shown in FIG. 8, when the displacement combination 20 formed by the relay lens RL and the fiber input FIN moves downward DN (that is, deviating from the central axis AX downward DN) by the second distance D2, the incident position on the collimator lens CL that the incident light is emitted to will also move downward DN (that is, deviating from the central axis AX downward DN).

Compared to the prior art, the spectrometer of the invention can simply rotate or move its input-side element to move up or down the imaging position on the focal plane that the beams are focused, thereby achieving the effect of facilitating the user to adjust/calibrate the imaging position of the spectrometer.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A spectrometer, comprising:
a fiber input, a collimator lens, a rotating shaft, a grating, a focal lens and a focal plane which have arranged in order, a broadband incident light of the fiber input becoming a first parallel beam through the collimator lens and being separated by the grating into multiple parallel beams of different wavelengths and then being focused by the focal lens to emit an output beams to an imaging position on the focal plane;
wherein when the collimator lens and the fiber input rotate to change the imaging position on the focal plane, a moving direction of the fiber input and a moving direction of the imaging position on the focal plane are opposite to each other.

2. The spectrometer of claim 1, wherein when the fiber input moves downward, the imaging position on the focal plane moves upward.

3. The spectrometer of claim 1, wherein when the fiber input moves upward, the imaging position on the focal plane moves downward.

4. The spectrometer of claim 1, wherein a rotation direction of the collimator lens and the fiber input is clockwise or counterclockwise.

5. A spectrometer, comprising:
a fiber input, a relay lens, a collimator lens, a grating, a focal lens and a focal plane which have arranged in order, a broadband incident light of the fiber input being extended by the relay lens and then becoming a first parallel beam through the collimator lens and being separated by the grating into multiple parallel beams of different wavelengths and then being focused by the focal lens to emit an output beams to an imaging position on the focal plane;
wherein when the relay lens and the fiber input move to change the imaging position on the focal plane, a moving direction of the relay lens and the fiber input and a moving direction of the imaging position on the focal plane are opposite to each other.

6. The spectrometer of claim 5, wherein when the relay lens and the fiber input move upward, the imaging position on the focal plane moves downward.

7. The spectrometer of claim 5, wherein when the relay lens and the fiber input move downward, the imaging position on the focal plane moves upward.

8. The spectrometer of claim 5, wherein when the relay lens and the fiber input move, a moving direction of the relay lens and the fiber input is the same with a moving direction of an incident position on the collimator lens where the incident light is emitted to.

9. The spectrometer of claim 8, wherein when the relay lens and the fiber input move upward, the incident position on the collimator lens where the incident light is emitted to also moves upward.

10. The spectrometer of claim 8, wherein when the relay lens and the fiber input move downward, the incident position on the collimator lens where the incident light is emitted to also moves downward.

* * * * *